Dec. 7, 1971  G. FALDI  3,624,933
DREDGING PLANT APPARATUS COMBINING PUMPING AND DIGGING ACTION
Filed June 12, 1969  2 Sheets-Sheet 1
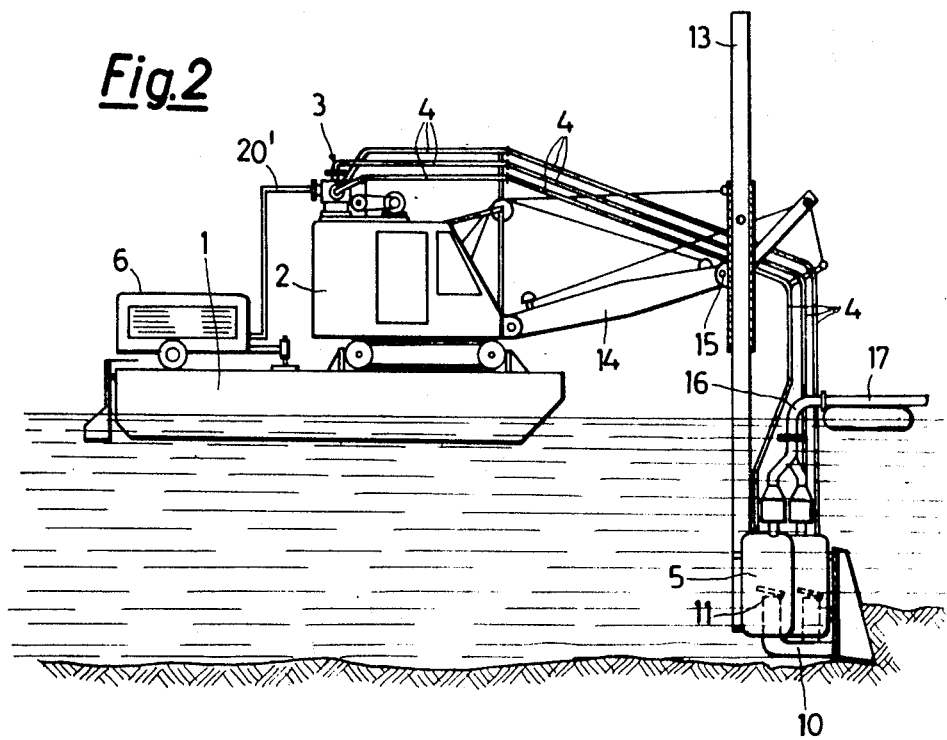
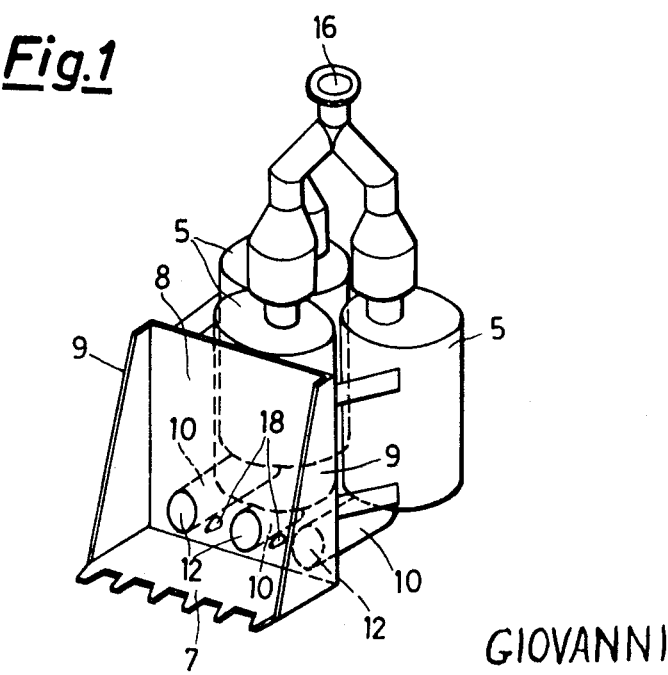
INVENTOR
GIOVANNI FALDI
BY KARL W FLOCKS
ATTORNEY

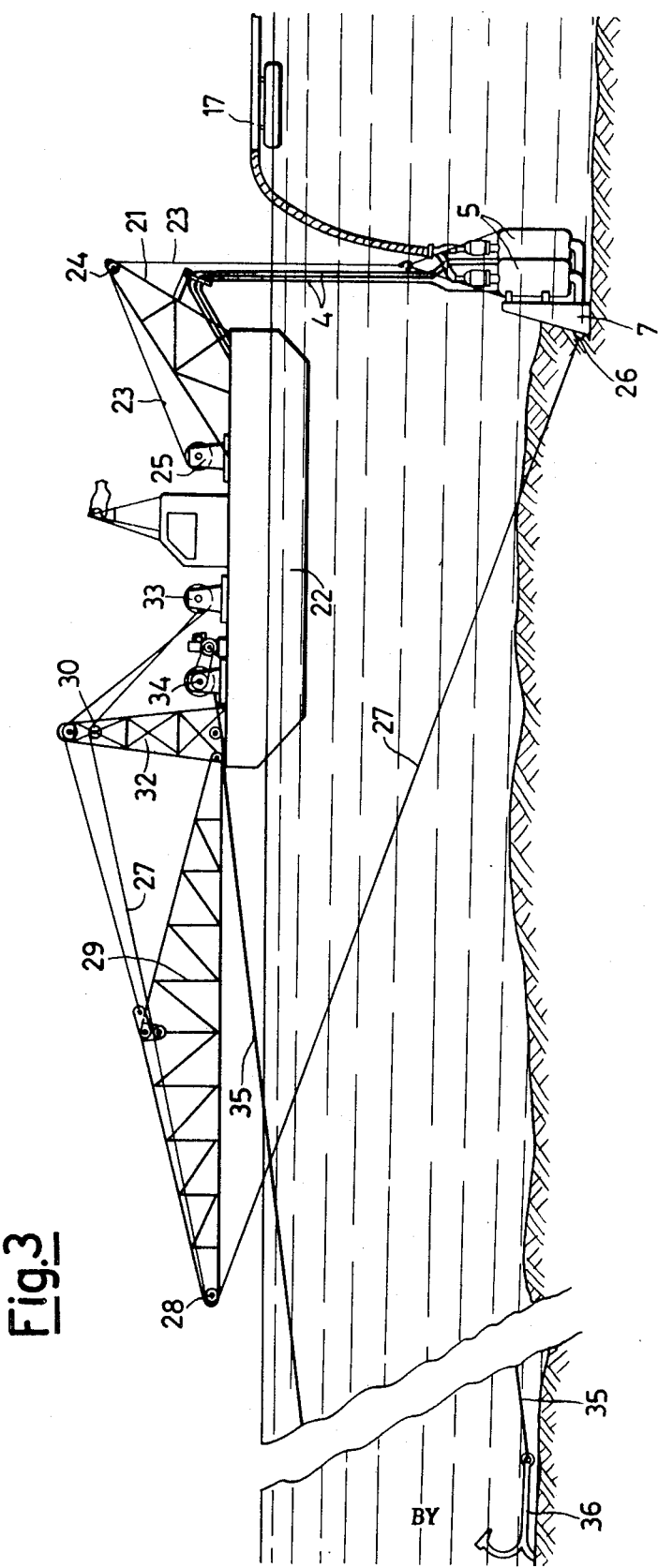

United States Patent Office 3,624,933
Patented Dec. 7, 1971

3,624,933
DREDGING PLANT APPARATUS COMBINING
PUMPING AND DIGGING ACTION
Giovanni Faldi, Via Por S. Maria 4,
Florence, Italy
Filed June 12, 1969, Ser. No. 832,788
Claims priority, application Italy, June 17, 1968,
17,828/68
Int. Cl. E02f 3/92
U.S. Cl. 37—63                                   4 Claims

ABSTRACT OF THE DISCLOSURE

Dredging plant apparatus in which the conventional pump body is integral with a digging shovel of an excavator. The device which is operative by thrusting or dragging action utilizes a shovel with a plurality of pump bodies opening in the rear of the shovel and with blowing nozzles also mounted thereon and with pump and nozzle openings directed in the direction of operation of the shovel.

---

Dredging plants are known, based on the use of compressed air pumps and comprising a pump body with cylindrical chambers equipped with intake and outlet valves for the fluidized material, said chambers being connected by means of an appropriate distributor to a compressed air source. In such plants the pump body is generally suspended by a steel cable and connected to the distributor and the reflow manifold by means of rubber hoses. It is obvious that such a plant does not permit to dredge, with satisfactory results, consistent materials when the soundings are too compact or when the soundings are made of mud which, due to its physical nature cannot be easily disaggregated.

The object of the present invention is to achieve good results in dredging also in the case of high compact or muddy soundings, by combining the pumping action with the digging action.

The installation which is the subject of this invention, even though it utilizes a compressed air pump comprising a pump body having more than one submerged chamber, each of which has an inlet and outlet valve and a piping for the connection to a compressed air source, is characterized in that the pump body is rigidly connected to a dredging tool, preferably in the form of a shovel having a toothed edge and a hopper in the rear portion, and in that the inlet valves of the several chambers of the pump body are connected to elbowed tubes whose mouths open into the hopper substantially in the direction of the advance motion of the shovel. By so doing, the penetrating and disaggregating action of the shovel in combination with the more efficient action of the pump, ensure a very high efficiency of the dredging plant.

The digging shovel with the pump body integral therewith can be applied to the dredging plant in such a way that it may work by thrust or by dragging.

In the former case, the pump body and shovel is affixed to the end of a telescopable stiff tubing which is connected to boom of movable excavating machine, which is not only capable of advancing and being rotated, but permits the telescopable arm to be lifted or lowered and to be swung forwards and backwards.

In the second case, the pump body and shovel are suspended astern of a vessel and is connected by ropes to the prow of the vessel, so that, as the vessel is dragged by an appropriate mechanism towards a heavy anchor or another fixed location, a dredging action may take place.

In many installations, dredging by dragging could be preferred over dragging by thrust, owing to the fact that in the former case there are no limits to the dredging depth (these limits exist in the second case since the pump body is supported by a rigid tubing having a definite length), and owing to the fact that, in the former case, a higher overall efficiency can be achieved since the shovel always contacts the soundings without being removed therefrom, contrary to what occurs in the second case due to the rolling motion undergone by the vessel which carries the excavating machine.

Still to the end of rendering the dredging plant more efficient on very compact soundings, the possibility is afforded of equipping the shovel with hydraulic or mechanical stirring means, for example blowing nozzles arranged in the vicinity of the mouths of the elbowed tubings connected to the inlet valves of the pump body.

A few merely exemplary embodiments have been shown in the accompanying drawings, wherein:

FIG. 1 is a perspective view of the pump body with the digging shovel integral therewith;

FIG. 2 is a diagrammatical view of a dredging plant in which the digging shovel works by thrust;

FIG. 3 is a diagrammatical view of a dredging plant in which the digging shovel works by dragging.

FIG. 1 illustrates the dredging tool consisting of a pump body having three cylindrical chambers 5 and actuated by compressed air, and a toothed edge digging shovel 7 affixed to the assembly of the three chambers, the shovel being shaped like a hopper with its rear wall 8 and the sidewalls 9.

The compressed air pumps of the type considered herein are well known in the art. By way of example, a pump which is adapted to the application in the installation of the present invention is the one disclosed in U.S. Patent No. 2,857,852, said patent describing also a type of distributor associated to the pump and which can be used in the subject installation. The intake valves 11 for introducing the dug out material into the three chambers 5, are connected to three elbowed tubes 10 which, through the wall 8, open in 12 in vicinity of the hopper bottom 7. The numeral 16 indicates the delivery end of the material in the pump body. The numeral 18, instead, indicates ejecting nozzles through which water or possibly compressed air can be fed to the shovel so as to facilitate the crushing of the dredged material.

As outlined above, the dredging tool may work either by thrust or by dragging.

The former case is diagrammatically shown in FIG. 2.

In the example shown, the whole installation rests on a lighter 1, but can also rest on the bank of a canal or a lake or on a pier and the like.

On the floating vessel 1 the excavating machine 2 is mounted and the distributor assembly 3 is placed in the neighbourhood thereof and is connected, via two or more compressed air pipes 4, to the pump body 5 and, via a piping 20', to a compressor 6.

The assembly consisting of the pump body 5 and the shovel 7 is fastened to a telescopable tube 13 which is supported by the boom 14 of the excavator 2 and can be swung forward and backward about the pin 15.

A hose connects the delivery 16 of the pump body to the reflow pipe 17, which is also floating.

Lastly, still through the rear wall 8 of the shovel-hopper a disaggregating mechanism of hydraulic type can be inserted, which, in the example shown, consists of ejecting nozzles 18.

The second mode of operation, the one called by dragging, is diagrammatically shown in FIG. 3. In the example shown, the pump body with the chambers 5 and the toothed-edge shovel 7 is suspended to the framing 21 astern of the vessel 22 by a rope 23 passed over the pulley 24 and which is fastened to the drum of a winch 25 by means of which the pump body can be lifted or lowered. The shovel 7, instead, is affixed to the end 26 of a rope 27 which passes over a pulley 28 at the end of a boom 29 mounted ahead of the vessel 22 and over the pulley 30 of the derrick 32, to be wound about the drum of a winch 33. Ahead of the vessel 22 another winch 34 is also mounted for taking up the drag cable 35 connected at the opposite end to the anchor 36. By taking up the cable 35, the vessel goes towards the anchor 36, the digging shovel 7 dredges the soundings and the dug out material is forwarded by the pump 5 to the outflow pipe 17.

What is claimed is:

1. Dredging plant apparatus connected to a vessel comprising
    a dredging tool having the form of a shovel with a hopper in its rear portion;
    a pump body rigidly connected to said dredging tool and including
        a plurality of submerged chambers, each equipped with intake and delivery valves,
        elbowed tubes connected with said intake valves in said chambers and having their opposite ends open through said hopper substantially in the direction in which said shovel is moved,
        connecting means to connect said chambers to a source of compressed air;
    means to attach the combination of said dredging tool and said pump body to the vessel for movement therewith including
        first cable means and second cable means extending astern of the vessel attached to said combination and to the vessel
    whereby said combination of said dredging tool and said pump body is advanced by dragging.

2. The apparatus in accordance with claim 1, further characterized by said shovel being equipped with disintegrating means acting in the direction of movement of said shovel.

3. The apparatus in accordance with claim 2, further characterized by said disintegrating means being blowing nozzles connected to said source of compressed air.

4. The apparatus in accordance with claim 1, further characterized by
    said first cable means being a cable extending from the stern of the vessel and being of adjustable length, and
    said second cable means being a cable extending from the bow of the vessel.

References Cited

UNITED STATES PATENTS

| | | | |
|---|---|---|---|
| 413,091 | 10/1889 | Riker | 37—71 X |
| 1,801,652 | 4/1931 | Alby | 37—71 X |
| 2,857,852 | 10/1958 | Carignani et al | 417—122 |
| 2,933,837 | 4/1960 | Nelson | 37—65 |
| 2,952,083 | 9/1960 | Forkner | 37—71 |
| 3,187,447 | 6/1965 | Hollyoak | 37—78 |
| 3,253,357 | 5/1966 | Allard | 37—65 |
| 3,495,409 | 2/1970 | Riedemann | 37—64 UX |

FOREIGN PATENTS

| | | |
|---|---|---|
| 189,133 | 2/1957 | Austria. |

ROBERT E. PULFREY, Primary Examiner

C. D. CROWDER, Assistant Examiner

U.S. Cl. X.R.

37—71, 72